United States Patent [19]

McCallum, III et al.

[11] Patent Number: 5,412,051
[45] Date of Patent: May 2, 1995

[54] AMINE-THIOL CHAIN TRANSFER AGENTS

[75] Inventors: Thomas F. McCallum, III, Philadelphia; Barry Weinstein, Dresher, both of Pa.

[73] Assignee: Rohm and Haas Company, Philadelphia, Pa.

[21] Appl. No.: 179,499

[22] Filed: Dec. 20, 1993

Related U.S. Application Data

[62] Division of Ser. No. 36,595, Mar. 24, 1993, Pat. No. 5,298,585.

[51] Int. Cl.$^6$ .......................... C08F 2/38; C08F 20/06
[52] U.S. Cl. .................................. 526/317.1; 526/220
[58] Field of Search ................. 525/59, 185, 189, 242, 525/296, 299, 301, 302, 306, 308, 309, 311, 313; 526/317.1, 220

[56] References Cited

U.S. PATENT DOCUMENTS 4,217,260  8/1980  Daniel et al. .......................... 525/72
4,699,950  10/1987  Sato et al. ............................ 525/185

FOREIGN PATENT DOCUMENTS 2051317  4/1972  Germany .

Primary Examiner—John Kight, III
Assistant Examiner—Shelley A. Dodson
Attorney, Agent, or Firm—David T. Banchik

[57] ABSTRACT

Polymers having amine sulfide terminal moieties are provided. The amine sulfide terminal moieties are imparted by using amine-thiols as chain transfer agents in aqueous addition polymerizations.

The polymers are useful as mineral dispersants, as water-treatment additives for boiler waters, cooling towers, reverse osmosis applications, sugar refining, paper production, geothermal processes and oil wells, and as detergent additives acting as builders, anti-filming agents, dispersants, sequestering agents and encrustation inhibitors.

10 Claims, No Drawings

AMINE-THIOL CHAIN TRANSFER AGENTS

This is a divisional of application Ser. No. 36,595, filed Mar. 24, 1993, now U.S. Pat. No. 5,298,585.

This invention relates to amine-thiol chain transfer agents. In particular, this invention relates to the use of amine-thiols in aqueous addition polymerizations.

It is frequently desirable to control the molecular weight of polymer mixtures. Low molecular weight polymers have a weight average molecular weight ($M_w$) below 50,000. Low molecular weight polymers are useful, for example, as mineral dispersants, as water-treatment additives for boiler waters, cooling towers, reverse osmosis applications, sugar refining, paper production, geothermal processes and oil wells, and as detergent additives acting as builders, anti-filming agents, dispersants, sequestering agents and encrustation inhibitors.

One method of achieving low molecular weight polymers is by utilizing increased amounts of initiators. Attempting to produce low molecular weight polymers by increasing the amount of initiator is problematic. This approach adds considerably to the cost of production and may result in polymer chain degradation, crosslinking, and high levels of unreacted initiator remaining in the product.

The use of high levels of metal ions has also been tried as a means for producing low molecular weight polymers. This approach suffers from increased cost and has associated with it serious health and environmental concerns. In addition, the product is usually discolored by the metal ions.

Another method of achieving low molecular weight polymers is by utilizing one or more chain transfer agents during the polymerization.

The use of 2-mercaptoethyl ammonium chloride as a chain transfer agent in free-radical polymerizations was disclosed in *Polymer*, Vol. 14, November 1973, pages 587–588 by DeBoos. DeBoos disclosed solvent-based homopolymerizations of styrene, methyl methacrylate, butyl methacrylate, methyl acrylate, ethyl acrylate and butyl acrylate. The polymerizations were conducted in alcohols via a batch process.

The chain transfer agents previously known, such as mercaptans, suffer drawbacks from inefficiency, expense, and odor. The previously known chain transfer agents may require complex synthetic techniques, and their use in polymerizations may necessitate the use of special handling equipment, purification steps and removal steps. Furthermore, the previously known alcohol-based solvent processes utilizing chopin transfer agents cannot be used to produce acid-containing polymers.

The present invention seeks to overcome the problems associated with the previously known chain transfer agents.

According to a first aspect of the invention there is provided a polymer, comprising, as polymerized units:
  at least 20 percent by weight of one or more monoethylenically unsaturated acids, or salts thereof, and
  at least one amine-sulfide terminal moiety.

According to a second aspect of the present invention there is provided a process for preparing amine-sulfide terminated polymers comprising:
  forming an aqueous reaction mixture of water,
  one or more monomers wherein at least 20 percent by weight of the one or more monomers are monoethylenically unsaturated acids, or salts thereof,
  one or more amine-thiols, and
  one or more water-soluble initiators; and
  maintaining the aqueous reaction mixture at an elevated temperature to form amine-sulfide terminated polymers.

Amine-thiols are compounds which contain, or those which under the conditions of the polymerization will contain: one or more amine groups ($-NR_1R_2$) wherein $R_1$ and $R_2$ are each indepently selected from hydrogen and alkyl groups having from one to four carbon atoms; and one or more thiol groups ($-SH$). Preferably, the amine group is a primary amine/$-NH_2$). The amine-thiols suitable for the present invention are capable of functioning as a chain transfer agent for aqueous addition polymerizations; thereby imparting an amine-sulfide terminal moiety to the polymer chain. The amine-sulfide moiety is the residue of the amine-thiol resulting from the attachment of the sulfur group of the amine-thiol to the polymer chain.

Amine-thiols suitable for the present invention include: amino acids containing one or more amines and one or more thiols; derivatives, peptides and polypeptides of amino acids containing one or more amines and one or more thiols: derivatives, peptides and polypeptides of amino acids containing one or more thiols and one or more protected amines wherein the protecting group is capable of being removed; and aminoalkyl thiols. A suitable amino acid is, for example, cysteine ("Cys"). Suitable derivatives of amino acids containing one or more amines and one or more thiols are, for example, N-alkyl and N,N-dialkyl substituted amino acids wherein the alkyl groups each contain from one to four carbon atoms. A suitable polypeptide of an amino acid containing one or more amines and one or more thiols is, for example, glutathione ("GSH"). A suitable derivative of an amino acid containing one or more thiols and one or more protected amines wherein the protecting group is capable of being removed is, for example, N-acyl cysteine ("N—Ac"). In addition, cystine may be used in the present invention under polymerization conditions which cause the cystine to cleave at the sulfur-sulfur bond to form at least one cysteine molecule. Suitable amino-alkyl thiols are, for example, as small as aminoethane thiol (AET), but it is preferred that the amino-alkyl thiols have at least three carbons. Other suitable amino-alkyl thiols are, for example, N-alkyl and N,N-dialkyl substituted amino-alkyl thiols wherein the alkyl groups each contain from one to four carbon atoms, such as, for example, N-butylaminoethanethiol, N,N-diethylaminoethanethiol and salts thereof. The one or more amine-thiol are generally used in an amount corresponding to a molar ratio of the one or more monomers to the one or more amine-thiols of from about 3:1 to about 300:1, preferably from about 5:1 to about 100:1.

The amine-thiols are used as chain transfer agents for polymerizations of one or more monoethylenically unsaturated acids. Monoethylenically unsaturated acids can be mono-acids, di-acids or polyacids and the acids may be carboxylic acids, sulphonic acids, phosphonic acids, salts or combinations thereof. Suitable monoethylenically unsaturated acids are, for example, acrylic acid, methacrylic acid, crotonic acid, vinylacetic acid and the alkali metal and ammonium salts thereof. Suitable monoethylenically unsaturated dicarboxylic acids and the anhydrides of the cis-dicarboxylic acids are, for example, maleic acid, maleic anhydride, 1,2,3,6-tetrahydrophthalic anhydride, 3,6-epoxy-1,2,3,6-tetrahydrophthalic anhydride, 5-norbornene-2,3-dicarboxylic anhydride, bicyclo[2.2.2]-5-octene-2,3-dicarboxylic anhydride, 3-methyl-1,2,6-tetrahydrophthalic anhydride, 2-methyl- 1,3,6-tetrahydrophthalic anhydride, itaconic acid, mesaconic acid, fumaric acid, citraconic acid, 2-acrylamido-2-methylpropanesulfonic acid, allylsulfonic acid, allylphosphonic acid, allyloxybenzenesulfonic acid, 2-hydroxy-3-( 2-propenyloxy ) propanesulfonic acid, isopropenylphosphonic acid, vinylphosphonic acid, styrenesulfonic acid, vinylsulfonic acid and the alkali metal and ammonium salts thereof. Most preferably, the one or more monoethylenically unsaturated acids are acrylic acid, methacrylic acid or the alkali metal salts thereof. The one or more monoethylenically unsaturated acids represent at least about 20 percent by weight of the total monomer weight, preferably at least about 40 percent by weight of the total monomer weight.

In addition, the polymers of the present invention may contain, as polymerized units, one or more monoethylenically unsaturated acid-free monomers. Suitable monoethylenically unsaturated acid-free monomers include $C_1$–$C_4$ alkyl esters of acrylic or methacrylic acids such as methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate. Other monoethylenically unsaturated acid-free monomers are acrylamides and alkyl-substituted acrylamides including acrylamide, methacrylamide, N-tertiarybutylacrylamide, N-methylacrylamide, and N,N-dimethylacrylamide. Other examples of monoethylenically unsaturated acid-free monomers include acrylonitrile, methacrylonitrile, allyl alcohol, phosphoethyl methacrylate, 2-vinylpyridene, 4-vinylpyridene, N-vinylpyrrolidone, N-vinylformamide, N-vinylimidazole, vinyl acetate, and styrene. If used, the one or more monoethylenically unsaturated acid-free monomers represent less than about 80 percent by weight of the, total monomer weight, preferably less than about 60 percent by weight of the total monomer weight.

If desired, it is possible to incorporate polyethylenically unsaturated compounds into the polymerization. Polyethylenically unsaturated compounds function as crosslinking agents and will result in the formation of higher molecular weight polymers.

The polymers of the present invention contain at least one amine-sulfide terminal moiety resulting from the attachment of the sulfur group of the amine-thiol to the polymer chain. Preferably, the polymers of the present invention are amine-sulfide terminated homopolymers, copolymers or terpolymers of acrylic acid or methacrylic acid and salts thereof. More preferably, the polymers of the present invention are amine-sulfide terminated homopolymers of acrylic acid or methacrylic acid and salts thereof, or copolymers or terpolymers of acrylic acid or methacrylic acid or salts thereof with each other, maleic acid, maleic anhydride, 1,2,3,6-tetrahydrophthalic anhydride, 3,6-epoxy-1,2,3,6-tetrahydrophthalic anhydride, 5-norbornene-2,3-dicarboxylic anhydride, itaconic acid, fumaric acid, acrylamide, methacrylamide, N-tertiarybutylacrylamide, N-methylacrylamide, N,N-dimethylacrylamide, 2-acrylamido-2-methylpropanesulfonic acid, methyl acrylate, ethyl acrylate, butyl acrylate, methyl methacrylate, butyl methacrylate, isobutyl methacrylate, hydroxyethyl acrylate, hydroxypropyl acrylate, hydroxyethyl methacrylate and salts thereof.

The polymerization can be conducted as a cofeed, heel, semi-continuous or continuous process. Preferably, the polymerization is conducted as a cofeed process wherein substantially all of the one or more monomer, the initiator and the amine-thiol chain transfer agent are metered ("fed") into a polymerization reactor. Preferably, the one or more monoethylenically unsaturated monomers, the aminethiol chain transfer agent and the initiators are introduced into the reaction mixture as separate streams which are fed linearly (i.e. at constant rates). If desired, the streams can be staggered so that one or more of the streams are completed before the others. Generally, the feeds are conducted for from 5 minutes to 5 hours, preferably from 30 minutes to 4 hours, and most preferably from 1 hour to 3 hours.

When the process of the present invention is run as a heel process, a portion of the one or more monoethylenically unsaturated monomers, the one or more amine-thiol chain transfer agents, and/or a portion of the initiators are initially added to the reactor. The remainder of any of these reactants are then fed into the reactor in the same manner as described above for the cofeed process.

The processes by which the polymers of the present invention are prepared are aqueous processes, substantially free of organic solvents. The water may be introduced into the reaction mixture initially, as a separate feed, as the solvent for one or more of the other components of the reaction mixture or some combination thereof. Generally, the polymerizations have a final solids levels in the range of from about 20 percent to about 80 percent by weight of the reaction mixture, preferably in the range of from about 30 to about 70 percent by weight, and most preferably from about 40 to about 70 percent by weight of the reaction mixture.

The polymerization reaction is conducted at an elevated temperature which will depend on the choice of initiator, and target molecular weight. Generally, the temperature of the polymerization is up to the boiling point of the mixture although the polymerization can be conducted under pressure if higher temperatures are used. The reaction can be conducted under any suitable atmosphere such as for example, air, nitrogen or inert gas. Preferably, the temperature of the polymerization is from about 25° to about 110° C. and most preferably from about 40° to about 105° C.

Suitable initiators for the processes of the present invention are any conventional water-soluble initiators. One class of suitable initiators are free-radical initiators such as hydrogen peroxide, certain alkyl hydroperoxides, dialkyl peroxides, persulfates, peresters, percarbonates, ketone peroxides and azo initiators. Specific examples of suitable free-radical initiators include hydrogen peroxide, t-butyl hydroperoxide, di-tertiary butyl peroxide, ammonium persulfate, potassium persulfate, sodium persulfate, tertiary-amyl hydroperoxide, methylethyl ketone peroxide, 2,2'-azobis(2-amidinopropane), and 2,2'-azobis(4-cyanopentanoic acid). The free-radical initiators are typically used in amounts of from about 1 percent to about 50 percent based on the total monomer weight.

Water-soluble redox initiators may also be used. These initiators include, but are not limited to, sodium bisulfite, sodium sulfite, persulfates, hypophosphites, isoascorbic acid, sodium formaldehyde-sulfoxylate and the like, used with suitable oxidizing agents, such as the thermal initiators noted above. The redox initiators are typically used in amounts of from about 0.05 percent to about 10 percent, based on the weight of total monomer.

The pH of the polymerizing monomer mixture is preferably highly acidic, especially when using cysteine or aminnoethane thiol as the chain transfer agent. For example, when cysteine is used as the chain transfer agent, the preferred pH is below about 4.0 and most preferably below about 2.0. Other amine-thiol chain transfer agents are less sensitive to pH and are preferably used at a pH below about 6. The pH of the polymerizing monomer mixture can be controlled by a buffer system or by the addition of a suitable acid or base. The preferred pH of the polymerizing monomer mixture may also be selected to suit the choice of any redox couple used as an initiator.

The polymerizing monomer mixture is preferably substantially free of any metal ions. The addition of metal ions to the polymerizing monomer mixture adds to the cost of the process, may necessitate a separation or purification step, may discolor the product, and introduces contaminants.

The process of the present invention generally results in good conversion of the monomers into polymer product. However, if residual monomer levels in the polymer mixture are undesirably high for a particular application, their levels can be reduced by any of several techniques.

One common method for reducing the level of residual monomer in a polymer mixture is post-polymerization addition of one or more initiators or reducing agents which can assist scavenging of unreacted monomer.

Preferably, any post-polymerization additions of initiators or reducing agents are conducted at or below the polymerization temperature. The initiators and reducing agents suitable for reducing the residual monomer content of polymer mixtures are well known to those skilled in the art. Generally, any of the initiators suitable for the polymerization are also suitable for reducing the residual monomer content of the polymer mixture.

The level of initiators or reducing agents added as a means for reducing the residual monomer content of the polymer mixture should be as low as possible to minimize contamination of the product. Generally, the level of initiator or reducing agent added to reduce the residual monomer content of the polymer mixture is in the range of from about 0.1 to about 2.0, and preferably from about 0.5 to about 1.0 mole percent based on the total amount of polymerizable monomer.

The polymers of the present invention are water-soluble. The water-solubility is affected by the molecular weight of the polymers and the relative amounts, and the hydrophilicity, of the monomer components incorporated into the polymer. Generally, the weight average molecular weights ($M_w$) of the polymers are up to about 50,000 preferably from about 500 to about 25,000 and most preferably from about 1,000 to about 15,000.

The polymers of the present invention are useful, for example, as mineral dispersants, as water-treatment additives for boiler waters, cooling towers, reverse osmosis applications, sugar refining, paper production, geothermal processes and oil wells, and as detergent additives acting as builders, anti-filming agents, dispersants, sequestering agents and encrustation inhibitors.

POLYMER SYNTHESIS

Example 1

To a 300-milliliter, 4-neck flask equipped with a mechanical stirrer, reflux condenser, thermometer, and inlets for the gradual addition of monomer and initiator solution was added 75.0 grams of deionized water. The contents of the flask were stirred and heated to 92° C. Then, 0.20 grams of 2,2'-azobis(2-amidinopropane) dihydrochloride was added to the flask. An initiator solution of 0.80 grams of 2,2'-azobis(2-amidinopropane) dihydrochloride and 20.0 grams of deionized water was prepared. A chain transfer agent solution of 5.60 grams of cysteine, 5.4 g $H_2SO_4$ and 40.0 grams of deionized water was prepared. The chain transfer agent solution, initiator solution and 100.00 g of glacial acrylic acid were then fed into the flask linearly and separately while stirring over two hours. Once the additions were complete, the system was kept at 90°–92° C. for 30 minutes. The system was then cooled to room temperature. The data appear in Table I below. The pH of the final mixture was 1.1

Example 2

The procedure of Example 1 was repeated. The data appear in Table I below.

Example 3

The procedure of Example 1 was repeated except that nitrogen was bubbled through the reaction mixture throughout the course of the polymerization. The data appear in Table I below.

Example 4

The procedure of Example 1 was repeated except that the levels of 2,2'-azobis(2-amidinopropane) dihydrochloride were doubled. The data appear in Table I below.

Example 5

To a 300-milliliter, 4-neck flask equipped with a mechanical stirrer, reflux condenser, thermometer, and inlets for the gradual addition of monomer and initiator solution was added 75.00 grams of deionized water. 0.17 grams of 50 percent by weight aqueous sodium hydroxide and 0.15 grams of 2,2'- azobis(4-cyanopentanoic acid). The contents of the flask were stirred and heated to 92° C. An initiator solution of 0.50 grams of 2,2'-azobis(4-cyanopentanoic acid), 0.36 grams of 50 percent by weight aqueous sodium hydroxide and 20.0 grams of deionized water was prepared. A chain transfer agent solution of 28.4 grams of glutathione, 6.70 grams of 50 percent by weight aqueous sodium hydroxide and 100.0 grams of deionized water was prepared. The chain transfer agent solution, initiator solution and 100.00 g of glacial acrylic acid were then fed into the flask linearly and separately while stirring over two hours. Once the additions were complete, the system was kept at 90°–92° C. for 40 minutes. The system was then cooled to room temperature. The data appear in Table I below. The pH of the final mixture was 3.0.

Example 6

The same procedure as example 5 was followed except: to the flask was initially added 65.00 grams of deionized water, 0.22 grams of 50 percent by weight aqueous sodium hydroxide and 0.15 grams of 2,2'- azobis( 4-cyanopentanoic acid)l; the initiator solution was 0.45 grams of 2,2'- azobis(4-cyanopentanoic acid), 0.40 grams of 50 percent by weight aqueous sodium hydroxide and 20.0 grams of deionized water; the chain transfer agent solution was 38.4 grams of glutathione, 9.0 grams of 50 percent by weight aqueous sodium hydroxide and 100.0 grams of deionized water was prepared; the monomer was 90.0 grams of acrylic acid.

Example 7

A similar procedure as example 5 was followed except that glutathione was used in an amount to provide a molar ratio of monomer to glutathione of about 30:1.

Example 8

To a 1-liter, 4-neck flask equipped with a mechanical stirrer, reflux condenser, thermometer, and inlets for the gradual addition of monomer and initiator solution was added 120 grams of deionized water which was stirred and heated to 92° C. To the flask was added a solution of 0.2 grams of 50 percent by weight aqueous sodium hydroxide, 0.15 grams of 2,2'-azobis(4-cyanopentanoic acid) and 5.0 grams of deionized water. An initiator solution of 1.0 grams of 2,2'-azobis(4-cyanopentanoic acid), 0.62 grams of 50 percent by weight aqueous sodium hydroxide and 30.0 grams of deionized water was prepared. A chain transfer agent solution of 15.1 grams of N-acyl cysteine, 6.0 grams of 50 percent by weight aqueous sodium hydroxide and 50.0 grams of deionized water was prepared. The chain transfer agent solution, initiator solution and 200 .00 g of glacial acrylic acid were then fed into the flask linearly and separately while stirring over two hours. Once tile additions were complete, the system was kept at 90°–92° C. for 30 minutes. The system was then cooled to room temperature. The data appear in Table I below.

Example 9

The procedure of example 8 was followed except: the to the flask was initially added 125 grams of deionized water; when heated to 92° C. was added a solution of 0.3 grams of 50 percent by weight aqueous sodium hydroxide, 0.2 grams of 2,2'-azobis(4-cyanopentanoic acid) and 5.0 grams of deionized water; and the chain transfer agent solution was 30.2 grams of N-acyl cysteine, 12.0 grams of 50 percent by weight aqueous sodium hydroxide and 100.0 grams of deionized water. The data appear in Table I below.

Example 10

The procedure of Example 1 was repeated except: the initiator solution was 0.80 grams of 2,2'-azobis(2-amidinopropane) dihydrochloride and 20.0 grams of deionized water; the chain transfer agent solution was 5.25 grams of aminoethane thiol hydrochloride and 30.0 grams of deionized water.

Example 11

To a 300-milliliter, 4-neck flask equipped with a mechanical stirrer, reflux condenser, thermometer, and inlets for the gradual addition of monomer and initiator solution was added 65.00 grams of deionized water which was stirred and heated to 91° C. To the flask was added 0.1 grams of 2,2'- azobis(4-cyanopentanoic acid). An initiator solution of 0.90 grams of 2,2'- azobis(4-cyanopentanoic acid) and 30.0 grams of deionized water was prepared. A chain transfer agent solution of 16.8 grams of cysteine, 5.3 grams of sulfuric acid and 55.8 grams of deionized water was prepared. The chain transfer agent solution, initiator solution and 100.00 g of glacial acrylic acid were then fed into the flask linearly and separately while stirring over two hours. Once the additions were complete, the system was kept at 90°–92° C. for 30 minutes. The system was then cooled to room temperature. The data appear in Table I below.

Example 12

The procedure of example 11 was followed except: the initiator solution was 0.36 grams of 2,2'- azobis(4-cyanopentanoic acid) and 20.0 grams of deionized water: the chain transfer solution was 5.6 grams of cysteine, 2.1 grams of sulfuric acid and 30.0 grams of deionized water.

Example 13

The procedure of example 11 was followed except: the initiator solution was 0.40 grams of 2,2'-azobis(4-cyanopentanoic acid) and 20.0 grams of deionized water; the chain transfer solution was 5.6 grams of cysteine, 5.4 grams of sulfuric acid and 40.0 grams of deionized water.

Example 14

To a 1-liter, 4-neck flask equip with a mechanical stirrer, reflux condenser, thermometer, and inlets for the gradual addition of monomer and initiator solution was added 220 grams of deionized water which was stirred and heated to 92° C. To the flask was added 0.25 grams of sodium persulfate dissolved in 5 grams of deionized water. An initiator solution of 2.50 grams of sodium persulfate and 30.0 grams of deionized water was prepared. A chain transfer agent solution of 14.0 grams of cysteine, 8.70 grams of 50 percent by weight aqueous sodium hydroxide and 90.0 gram s of deionized water was prepared. The chain transfer agent solution, initiator solution and 100.00 g of glacial acrylic acid were then fed into the flask linearly and separately while stirring over 2.5 hours. Once the additions were complete, the system was kept at 90°–92° C. for 20 minutes. A final solution of 0.3 grams of sodium persulfate and 20 grams of deionized water was added to flask. After 20 minutes, the system was then cooled to room temperature. The data appear in Table I below. The pH of the final mixture was 2.3. It is believed that the relatively: high molecular weight of this product is a result of the amine-thiol reacting with the persulfate, thereby reducing the amount of persulfate capable of functioning as an initiator.

Example 15

The procedure of example 14 was followed except: to the flask was initially added 150 grams of deionized water; when heated to 92° C., 0.20 grams of 2,2'-azobis-2-amidinopropane)dihydrochloride was added: the initiator solution was 1.05 grams of 2,2'-azobis(2-amidinopropane)dihydrochloride and 60.0 grams of deionized water; the chain transfer agent solution was 22.5 grams of cysteine, 12.5 grams of 50 percent by weight aqueous sodium hydroxide and 60.0 grams of deionized water; 200.00 g of glacial acrylic acid were used; the solutions were fed into the flask linearly and separately while stirring over two hours; no attempt was made to reduce the residual monomer levels. The pH of the final mixture was 3.9.

Comparative Example 1

The procedure of Example 1 was repeated except that the chain transfer agent solution was 4.86 grams of L-serine ("Ser") and 40.0 grams of deionized water.

Comparative Example 2

The procedure of Example 1 was repeated except: the chain transfer agent solution was 6.8 grams of L-methionine ("Met"), 5.4 grams of sulfuric acid and 40.0 grams of deionized water; the solutions were fed into the flask linearly and separately while stirring over one hour.

Comparative Example 3

The procedure of example 14 was followed except the initiator solution was 2.5 grams of sodium persulfate and 60.0 grams of deionized water, the chain transfer solution was 12.2 grams of mercaptopropionic acid ("MPA") and 60.0 grams of water and the final solution was 0.5 grams of sodium persulfate and 5.0 grams of deionized water. The data appear in Table I below.

Comparative Example 4

A similar procedure as example 1 was followed except that glutamic acid ("Glu") was used as the amine-thiol chain transfer agent in an amount to provide a molar ratio of monomer to Glu of about 30:1.

The data appearing Table I, below, are the weight average molecular weight ("$M_w$") and number average molecular weight ("$M_n$") as measured by aqueous gel permeation chromatography using a 4,500 $M_w$ poly(acrylic acid) standard. The chain transfer agent ("CTA") and the molar "Ratio" of the monomer to the amine-thiol are also listed.

TABLE I

| Example | CTA | $M_w$ | $M_n$ | Ratio |
| --- | --- | --- | --- | --- |
| 1 | Cys | 4500 | 3750 | 30:1 |
| 2 | Cys | 4720 | 3830 | 30:1 |
| 3 | Cys | 4480 | 3680 | 30:1 |
| 4 | Cys | 4870 | 3850 | 30:1 |
| 5 | GSH | 5130 | 4160 | 15:1 |
| 6 | GSH | 3810 | 3280 | 10:1 |
| 7 | GSH | 5960 | 4830 | 30:1 |
| 8 | N—Ac | 5960 | 4830 | 30:1 |
| 9 | N—Ac | 3900 | 3310 | 15:1 |
| 10 | AET | 4700 | 3860 | 30:1 |
| 11 | Cys | 2570 | 2300 | 10:1 |
| 12 | Cys | 7490 | 5180 | 30:1 |
| 13 | Cys | 4790 | 3940 | 30:1 |
| 14 | Cys | 91700 | 49960 | 30:1 |
| 15 | Cys | 13200 | 7900 | 15:1 |
| Comp. 1 | Ser | 95100 | 31300 | 30:1 |
| Comp. 2 | Met | 117000 | 32900 | 30:1 |
| Comp. 3 | MPA | 3680 | 3130 | 30:1 |
| Comp. 4 | Glu | 131000 | 61900 | 30:1 |

We claim:

1. A process for preparing amine-sulfide terminated polymers comprising:
   forming an aqueous reaction mixture of water, one or more monomers wherein at least 20 percent by weight of the one or more monomers are monoethylenically unsaturated acids, or salts thereof, one or more amine-thiols, and one or more water-soluble initiators; and maintaining the aqueous reaction mixture at an elevated temperature to form amine-sulfide terminated polymers.

2. The process of claim 1, wherein the amine-thiol is selected from the group consisting of: amino acids containing one or more amines and one or more thiols; derivatives, peptides and polypeptides of amino acids containing one or more amines and one or more thiols; and derivatives, peptides and polypeptides of amino acids containing one or more thiols and one or more protected amines wherein the protecting group is capable of being removed.

3. The process of claim 1, wherein the amine-thiol is selected from the group consisting of: cysteine, N-acyl cysteine, cystine and glutathione.

4. The process of claim 1, wherein the amine-thiol is selected from the group consisting of: cysteine, N-acyl cysteine, and glutathione.

5. The process of claim 1, wherein the amine-thiol is an aminoalkyl thiol.

6. The process of claim 1, wherein the amine-thiol is aminoethane thiol.

7. The process of claim 1, wherein the one or more monomers are acrylic acid, methacrylic acid or salts thereof.

8. The process of claim 1, wherein the one or more monoethylenically unsaturated acids are selected from the group consisting of acrylic acid, methacrylic acid, crotonic acid, vinylacetic acid, maleic acid, maleic anhydride, 1,2,3,6-tetrahydrophthalic anhydride, 3,6-epoxy-1,2,3,6-tetrahydrophthalic anhydride, 5-norbornene-2,3-dicarboxylic anhydride, bicyclo[2.2.2]-5-octene-2,3-dicarboxylic anhydride, 3-methyl-1,2,6-tetrahydrophthalic anhydride, 2-methyl-1,3,6-tetrahydrophthalic anhydride, itaconic acid, mesaconic acid, fumaric acid, citraconic acid, 2-acrylamido-2-methylpropanesulfonic acid, allylsulfonic acid, allylphosphonic acid, allyloxybenzenesulfonic acid, 2-hydroxy-3-(2-propenyloxy) propanesulfonic acid, isopropenylphosphonic acid, vinylphosphonic acid, styrenesulfonic acid, vinylsulfonic acid and the alkali metal and ammonium salts thereof.

9. The process of claim 1 wherein, up to about 80 percent by weight of the one or more monomers are monoethylenically unsaturated acid-free monomers.

10. The process of claim 9 wherein the monoethylenically unsaturated acid-free monomers are selected from the group consisting of acrylamide, methacrylamide, N-tertiarybutylacrylamide, N-methylacrylamide, N,N-dimethylacrylamide, methyl acrylate, ethyl acrylate, butyl acrylate, methyl methacrylate, butyl methacrylate, isobutyl methacrylate, hydroxyethyl acrylate, hydroxypropyl acrylate, and hydroxyethyl methacrylate.

* * * * *